United States Patent [19]

Merritt et al.

[11] 4,070,261
[45] Jan. 24, 1978

[54] PRODUCTION OF $B_2H_6$ FROM $BCL_3$ + $H_2$ AT ROOM TEMPERATURE BY LASER INDUCED CHEMISTRY

[75] Inventors: James A. Merritt, Pulaski; Lawrence C. Robertson, Fayetteville, both of Tenn.

[73] Assignee: The United States of America as represented by the Secretary of the Army, Washington, D.C.

[21] Appl. No.: 783,579

[22] Filed: Apr. 1, 1977

[51] Int. Cl.² .............................................. B01J 1/10
[52] U.S. Cl. ........................................... 204/157.1 R
[58] Field of Search .............. 204/157.1 R, DIG. 11

[56] References Cited

PUBLICATIONS

Karlov, Applied Optics, (Feb., 1974), vol. 13, No. 2, pp. 301 & 306.
Rockwood et al., Chemical Physics Letters, (Aug. 1, 1975), vol. 34, No. 3, pp. 542–545.

*Primary Examiner*—Howard S. Williams
*Attorney, Agent, or Firm*—Nathan Edelberg; Robert P. Gibson; Jack W. Voigt

[57] ABSTRACT

A $CO_2$ laser is used to irradiate a laser cell containing gaseous $BCl_3$ + $H_2$ at room temperature (25° C) to produce $B_2H_6$. The product is sufficiently stable (no loss of concentration over a period of 72 hours) to permit separating $B_2H_6$ and recycling the remaining $BCl_3$ to obtain high efficiency production of $B_2H_6$.

2 Claims, 5 Drawing Figures

PRODUCTION OF $B_2H_6$ FROM $BCl_3 + H_2$ AT ROOM TEMPERATURE BY LASER INDUCED CHEMISTRY

DEDICATORY CLAUSE

The invention described herein may be manufactured, used, and licensed by or for the Government for governmental purposes without the payment to us of any royalties thereon.

BACKGROUND OF THE INVENTION

Diborane ($B_2H_6$) has been synthesized from $BCl_3$ and $H_2$ pyrolysis at high temperatures (550° C–950° C), by pyrolysis (650° C) using various catalysts, and by electric discharge.

Diborane has also been prepared by reacting polymeric boron monoxide with gaseous hydrogen, in accordance with U.S. Pat. No. 3,021,197, at a temperature of about 850° C to 1500° C. The principal gaseous product of the reaction is diborane. Small proportions of other boron hydrides are obtained under some conditions. The diborane is separated by condensing at −196° C after the other contaminants are separated in a cool zone prior to the condensation of diborane.

Diborane, also referred to as boroethane, has a molecular weight of 27.69. It is a colorless gas with a specific gravity when liquid of 0.45. The melting point of diborane is −169° C; the boiling point is −92.5° C.

Diborane is used as a reactant for making higher boron hydrides which are more stable and which are useful as fuels for engines and rockets. In addition to its usefulness as a starting material for making the hydrogen-boron compounds, diborane has usefulness as a reactant for making other boron derivatives since it is a highly reactive compound.

Because of diborane's highly reactive nature, however, higher boranes and other boron derivatives are formed from side reactions which take place, particularly when the synthesis takes place in a high heat bath which results in a high reaction temperature for the products as well as the reactants. These side reaction products are highly undesirable since they effect yield and complicate the separation procedures in obtaining diborane of high purity.

When diborane is synthesized from $BCl_3$ and $H_2$ a common long-lived intermediate, $HCl_2$, is formed. There may be other intermediates or unreacted products which require separation (e.g., $H_2$, $BCl_3$, $B_2H_nX_m$, etc. where $n$ and $m$ are intergers and X is chlorine); however, any contaminants complicate the separation and/or purification procedures for the highly reactive diborane.

Other investigators have attempted to make diborane by another method. For example, prior art investigators (Rockwood et al), using a pulsed $CO_2$ multimode laser with a 1.5 w and 200 ns gain-switched pulse attempted to synthesize $B_2H_6$, but without success.

It would be highly desirable and advantageous to synthesize diborane at a low reaction temperature since the production of undesirable intermediates would be lessened. Synthesis at low reaction temperatures would also permit better control of the desired product yield since many short-lived intermediates characteristic of high temperature reaction would complicate monitoring the progression of reaction.

An object of this invention is to provide a synthesis method which employs a laser induced chemical reaction for producing diborane at a low reaction temperature.

A further object of this invention is to provide a synthesis method which is accomplished at room temperature (e.g. 25° C) by a laser induced chemical reaction to produce diborane while producing no higher boranes or polymers which are produced under certain conditions by side reaction when synthesis takes place at high reaction temperatures.

SUMMARY OF THE INVENTION

When $BCl_3$ and hydrogen gas in admixture are irradiated with a $CO_2$ multiline cw laser, $HBCl_2$ is obtained as an intermediate in accordance with the following reaction:

$$BCl_3 + H_2 \rightarrow HBCl_2 + HCl.$$

$B_2H_6$ (diborane) begins to appear about 2 hours after the laser radiation is discontinued. The amount of $B_2H_6$ produced continues to grow after 16 hours elapsed time and reaches a maximum after about 24 hours in accordance with the following disproportionation reaction:

$$6\ HBCl_2 \rightleftarrows B_2H_6 + 4\ BCl_3.$$

The $B_2H_6$ was stable in the cell containing the reactants as evidenced by no decrease in concentration after 72 hours.

The concentration of $BCl_3$ and $H_2$ mixtures are maintained at about a half atmosphere of pressure since $BCl_3$ and $H_2$ mixtures are known to react explosively at a pressure of one atmosphere and above.

DESCRIPTION OF THE PREFERRED EMBODIMENT

The intermediate $HBCl_2$ is obtained after $BCl_3 + H_2$ is irradiated with a $CO_2$ multiline cw laser in accordance with the reaction as illustrated by equation 1.

$$BCl_3 + H_2 \xrightarrow{\text{laser radiation}} HBCl_2 + HCl \qquad (1)$$

Figure 1:
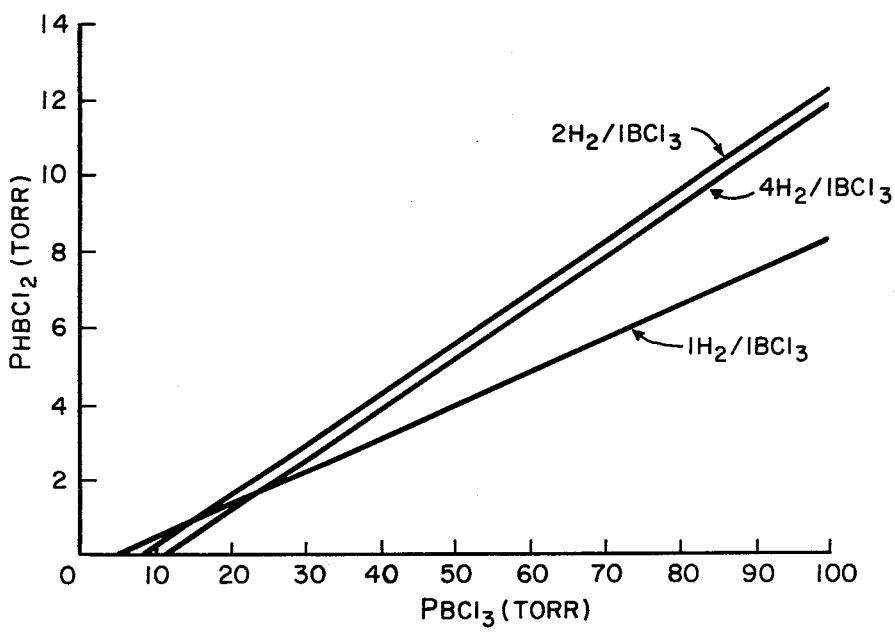
FIG. 1 illustrates the effect of variation of ratios of $H_2$ to $BCl_3$ to achieve maximum yield of $HBCl_2$.
Figure 2:
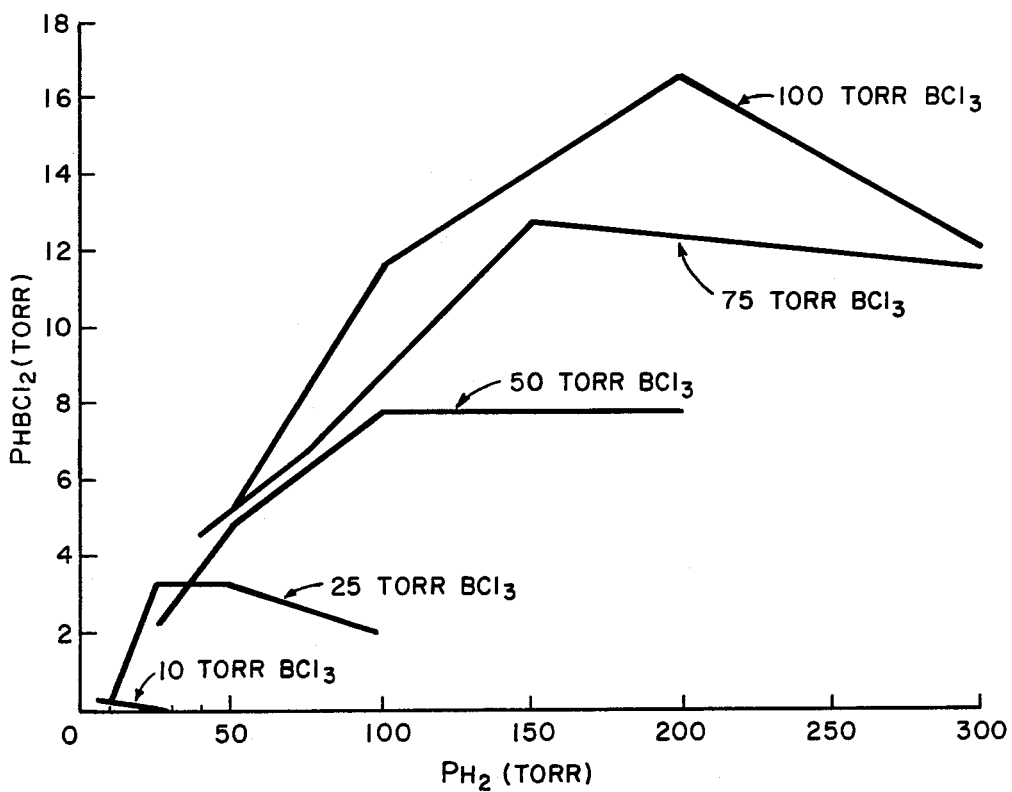
FIG. 2 illustrates how the production of $HBCl_2$ varies with $BCl_3$ pressure while $H_2$ pressure is held constant.

The maximum amount of $HBCl_2$ was produced with a two volume $H_2$ to 1 volume of $BCl_3$ as illustrated by FIG. 1 of drawing. FIG. 2 illustrates how the production of $HBCl_2$ varies with $BCl_3$ pressure variation. This curve illustrates that peak production of $HBCl_2$ is achieved when the $BCl_3$ pressure is 100 torr and $H_2$ pressure is 200 torr when using a laser power level of 150 watts.

The infrared curves 3a, 3b, and 3c illustrates the formation of $B_2H_6$ after laser radiation is discontinued and the $B_2H_6$ continues to grow in quantity up to about 24 hours elapsed time after radiation is discontinued. The $B_2H_6$ is formed by a disproportionation reaction as illustrated by equation 2.

$$6 HBCl_2 \rightleftharpoons B_2H_6 + 4 BCl_3 \qquad (2)$$

Since $BCl_3$ and $H_2$ mixtures are known to react explosively at one atmosphere and above, the pressure in the cell should be maintained below about a half atmosphere.

Figure 3:
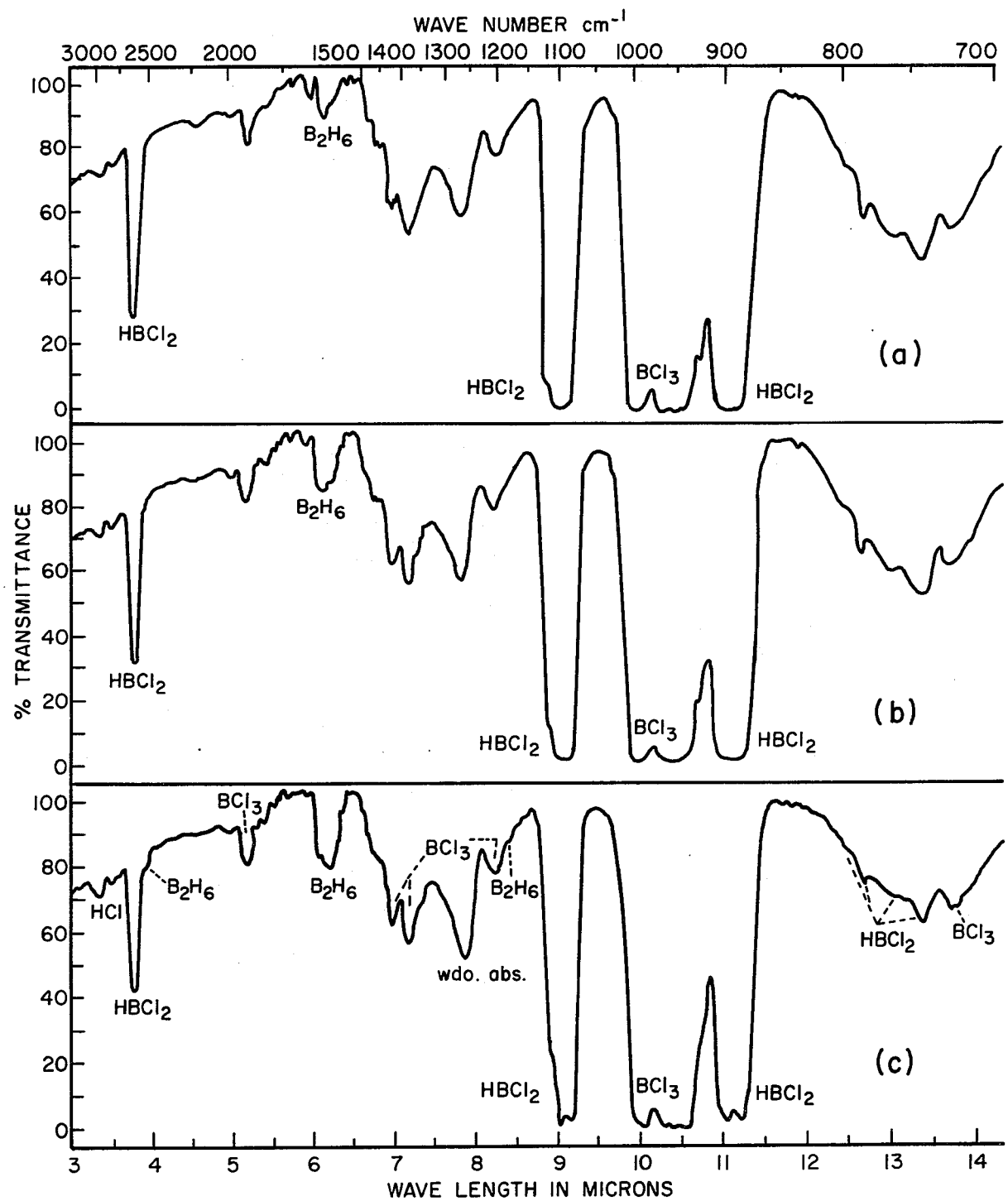
FIGS. 3a, 3b, and 3c are infrared spectra curves which verifies the appearance of $B_2H_6$ (diborane) at 2 hours elapsed time after laser radiation was discontinued, the continued increase of $B_2H_6$ at 16 hours elapsed time after laser radiation was discontinued, and the maximum concentration of $B_2H_6$ reached at about 24 hours elapsed time after laser radiation was discontinued.

In further reference to the drawing FIGS. 3a, 3b, and 3c wherein the percent transmittance is shown on the ordinate and the wave number and wavelength are shown on the abscissa, $B_2H_6$ appears on infrared curve 3a at about 2 hours elapsed time after laser radiation is discontinued, $B_2H_6$ continues to increase as shown by infrared curve 3b at about 16 hours elapsed after laser radiation is discontinued, and $B_2H_6$ reaches a maximum on infrared curve 3c at about 24 hours elapsed time after laser radiation is discontinued. Further evaluations indicate that $B_2H_6$ is stable in the cell containing the reactants and other products for 72 hours. The term wdo. abs. shown on curve 3c is window absorption, also indicated in curves 3a and 3b but not labeled.

In laser induced chemistry (LIC) as illustrated by equation 1 the temperature of the reaction is low (room temperature), and no higher boranes or polymers are formed as determined by interpretation of infrared curves 3a, 3b, and 3c. Both of these conditions are advantageous for economy reasons, ease of separation of product, and the purity level of product.

$BCl_3$ and $H_2$ in a predetermined metered ratio, preferably where the torr pressure of $H_2$ is about twice the torr pressure of $BCl_3$, are metered into a laser cell (e.g., a 10 cm × 3 cm stainless steel cell with NaCl windows on each end) to achieve a predetermined pressure maximum of not over about half atmosphere. The gaseous mixture is subsequently irradiated with a cw $CO_2$ multiline laser operating at a predetermined power level for a predetermined period of time to cause a formation of $HBCl_2$. The predetermined pressure maximum is to ensure that no violent reaction of $H_2/BCl_3$ mixture takes place. The power level of the cw $CO_2$ multiline laser of about 150 watts is based on the torr pressure and the molecular concentration of the gas molecules to achieve an efficient transfer of energy to cause LIC reaction. A power level of the laser operating in the range of 125 to 175 watts is satisfactory; however, the power level of 150 watts is preferred to provide maximum yield of the $HBCl_2$ for the described conditions. For larger systems the power level of the laser and the molecular concentration of the gases should be in consonance for complete irradiation while maintaining a minimum residual unreacted $BCl_3$. It has been determined that unreacted $BCl_3$ inhibits the disproportionation reaction of $HBCl_2$ to yield $B_2H_6$; therefore, the predetermined preferred pressure ratios of $BCl_3$ and $H_2$ should be monitored closely for the reasons stated.

An exposure time of a few seconds (e.g. about 2 seconds) by the laser ensures an absorption of radiation at about 10.6 microns since the $BCl_3$, $V_3$ (956 cm$^{-1}$) fundamental is resonant with the $CO_2$ ($P_{20}$) laser line and strongly absorbs this energy. During irradiation, $HBCl_2$ is formed and thereafter allowed to disproportionate for a period of time of about 24 hours to yield the maximum $B_2H_6$ for one cycle of operation. Separation of the product, $B_2H_6$, is accomplished by separation in a series of cold traps by means of a vacuum pump or purging system employing an inert gas such as $N_2$. The unreacted $BCl_3$ can be trapped, if desired, and can be recycled for further use after purification.

A spectra of the static product is obtained at various intervals after irradiation to ascertain that the desired product in maximum yield is obtained. A spectrophotometer such as a Beckman IR5 is suitable for this purpose.

Since a waiting period is required to allow for the disproportionation reaction to take place to yield a maximum yield of $B_2H_6$, a series of laser cells could be used where a greater production is required. Other arrangements could be made to adapt the system for production as compatible with the requirements such as production quantities, separation techniques etc., at a particular installation. The production of $B_2H_6$ by LIC conducted at room temperature offers particular advantages over high temperature synthesis. In addition to those advantages of reactions taking place at room temperature, the advantages of making a product with fewer impurities which lessens the problems of product separation and which enables the incorporation of a recycling phase for unreacted $BCl_3$ are readily recognized.

We claim:
1. A method for producing $B_2H_6$ by laser induced chemistry comprising:
  i. metering the gaseous reactants $BCl_3$ and $H_2$ in admixture into a laser cell to achieve a predetermined pressure ratio of said gaseous reactants up to a total pressure of about 0.5 atmosphere in said laser cell, said predetermined pressure ratio being in the range of about 1 of $BCl_3$ to about 1 to 4 of $H_2$ to ensure consonance between the concentration of said gaseous reactants and the power level of a cw $CO_2$ multiline laser employed to irradiate said gaseous reactants to produce the intermediate $HBCl_2$;
  ii. irradiating said gaseous reactants in admixture by a cw $CO_2$ multiline laser operating at a predetermined power level of said cw $CO_2$ multiline laser for a predetermined time period of a few seconds to effect a laser induced chemistry reaction which produces the intermediate $HBCl_2$;
  iii. allowing said $HBCl_2$ to undergo a disproportionation reaction for a predetermined time period from about 2 hours to about 24 hours to form the product $B_2H_6$ in said laser cell in the presence of unreacted products;
  iv. obtaining a spectra of the static products of said admixture to ascertain that said product $B_2H_6$ has been formed in a desired yield amount; and,
  v. separating said $B_2H_6$ from said unreacted products in said laser cell.

2. The method of claim 1 wherein said gaseous reactants are metered in a predetermined pressure ratio of about 100 torr of $BCl_3$ and of about 200 torr of $H_2$; said predetermined power level of said cw $CO_2$ multiline laser is about 150 watts; said predetermined time of irradiating is about 2 seconds; wherein said disproportionation reaction is allowed to take place for a predetermined time period of about 24 hours; and wherein said spectra ascertains that said product $B_2H_6$ has been formed in a desired maximum yield.

* * * * *